(12) United States Patent
Klunder et al.

(10) Patent No.: US 7,593,617 B2
(45) Date of Patent: Sep. 22, 2009

(54) OPTICAL WAVEGUIDE

(75) Inventors: Derk J. W. Klunder, Geldrop (NL); Bernardus H. W. Hendriks, Eindhoven (NL); Stein Kuiper, Vught (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/816,291

(22) PCT Filed: Feb. 15, 2006

(86) PCT No.: PCT/IB2006/050501

§ 371 (c)(1),
(2), (4) Date: Aug. 15, 2007

(87) PCT Pub. No.: WO2006/087681

PCT Pub. Date: Aug. 24, 2006

(65) Prior Publication Data

US 2008/0166089 A1    Jul. 10, 2008

(30) Foreign Application Priority Data

Feb. 17, 2005    (EP)    ................... 05101210

(51) Int. Cl.
*G02B 6/00* (2006.01)
(52) U.S. Cl. ........................................... 385/146
(58) Field of Classification Search ............... None
See application file for complete search history.

(56) References Cited

U.S. PATENT DOCUMENTS

| | | | |
|---|---|---|---|
| 4,867,559 A | 9/1989 | Back | |
| 5,194,915 A | 3/1993 | Gilby | |
| 6,404,941 B1 * | 6/2002 | Picard et al. | 385/18 |
| 6,516,108 B1 | 2/2003 | Zuras et al. | |
| 2002/0048425 A1 | 4/2002 | McBride et al. | |
| 2003/0012483 A1 | 1/2003 | Ticknor et al. | |
| 2004/0061845 A1 | 4/2004 | Dirac | |
| 2005/0226549 A1 | 10/2005 | Oakey et al. | |

FOREIGN PATENT DOCUMENTS

| | | |
|---|---|---|
| DE | 19536858 A1 | 4/1997 |
| EP | 1180713 A2 | 2/2002 |
| WO | WO02088686 A1 | 11/2002 |

(Continued)

OTHER PUBLICATIONS

Wolfe et al: "Dynamic Control of Liquid-Core/Liquid-Cladding Optical Waveguides"; Proc. Nat. Acad. Science, vol. 101, No. 34, Aug. 24, 2004, pp. 12434-12438, XP002395276.

(Continued)

*Primary Examiner*—Sung H Pak

(57) ABSTRACT

An optical waveguide comprises a body (13), the body including an entrance window (9) and an exit window (11) defining an optical path (13) through a cavity. The cavity contains a first fluid (A) and a second fluid (B), with an interface between the first fluid and the second fluid defined by a meniscus. The meniscus lies longitudinally along the optical path. Means for adjusting the meniscus are provided, for example a voltage source and at least two electrodes. Electrowetting can be used for influencing the fluids.

15 Claims, 8 Drawing Sheets

FOREIGN PATENT DOCUMENTS

| WO | WO2004015826 A1 | 2/2004 |
| WO | WO2004027490 A1 | 4/2004 |
| WO | WO2004051323 A1 | 6/2004 |

OTHER PUBLICATIONS

Dirac et al: "Realisation and Characterisation of All Liquid Optical Waveguides"; Proceedings of the IEEE 14th Annual International Conference on Microelectro Mechanical Systems. MEMS 2001. Interlaken, Switzerland, Jan. 21-25, 2001, IEEE International Micro Electro Mechanical Systems Conference, New York, NY, IEEE, vol. Conf. 14, Jan. 21, 2001, pp. 459-462, XP010534647.

Takiguchi et al: "Liquid/Liquid Optical Waveguides Using Sheath Flow as a New Tool for Liquid/Liquid Interfacial Measruements"; Applied Spectroscopy, vol. 57, No. 8, Aug. 2003, pp. 1039-1041, XP008067952.

\* cited by examiner

Equivalent index in the lateral direction and lateral intensity distribution of fundamental mode α1, α2, α3, α5, α6, α7 < αmin
α4 > αmin

OPTICAL WAVEGUIDE

This invention relates to an optical waveguide and to a method of guiding an optical signal.

Optical waveguides are used in a wide variety of different applications. They are commonly used in fields such as telecommunication and sensing and in the construction of laser cavities. The shape of a waveguide together with the properties of the material from which it is made (for example, whether there is a fixed refractive index or gradient index) determine the propagation modes, and thereby the optical characteristics of the waveguide.

In general, the cross-sectional shape of the waveguide remains fixed, which leads to substantially fixed propagation modes. The propagation constants of the waveguide modes can be changed by inducing a change in the refractive index of the layers of the waveguide, for example by changing the temperature, but in general any changes in the refractive index are too small to induce significant changes in the shape of the propagating modes.

An example of a more flexible waveguide system is disclosed in United States Patent Application Publication US 20030012483A1 which describes a microfluidic control for waveguide optical switches, variable attenuators, and other optical devices. In this document, devices utilize elements carried by a fluid in a microchannel to switch, attenuate, shutter, filter, or phase shift optical signals. In certain embodiments, a microchannel carries a gaseous or liquid slug that interacts with at least a portion of the optical power of an optical signal travelling through a waveguide. The microchannel may form part of the cladding of the waveguide, part of the core and the cladding, or part of the core only. The microchannel may also have ends or may be configured as a loop or continuous channel. The fluid devices may be self-latching or may be semi-latching. The fluid in the microchannel is moved using a variety of different methods including electrowetting.

In all cases the fixed waveguide shape limits the functionality of the device to the functionality as defined in the fabrication, which is typically done by means of micro-machining, where lithography and etching fix the layout of the chip. The problem is thus how to change the shape and propagation constants of the propagation mode(s) in a waveguide in a continuous way. Solving this problem results in a considerable improvement of the versatility/functionality of waveguide devices as the fabrication process is a less-limiting factor for the functionality of a device.

It is therefore an object of the invention to improve upon the known art.

According to a first aspect of the invention, there is provided an optical waveguide comprising a body, the body including an entrance window and an exit window defining an optical path through a cavity, the cavity containing a first fluid and a second fluid, with an interface between the first fluid and the second fluid defined by a meniscus, the meniscus lying longitudinally along the optical path.

According to a second aspect of the invention, there is provided a method of guiding an optical signal comprising receiving an optical signal at an entrance window of a body of a waveguide and guiding the optical signal along an optical path through a cavity of the body and to an exit window of the body, wherein the cavity contains a first fluid and a second fluid, with an interface between the first fluid and the second fluid defined by a meniscus, the meniscus lying longitudinally along the optical path.

Owing to the present invention, it is possible to provide an optical waveguide that has a very large amount of flexibility when in operation. The propagation properties of the waveguide can be adjusted by changing the shape of the meniscus that is the interface between the two immiscible fluids in the cavity of the waveguide body.

This invention supports a switchable fluid waveguide device. The switching is realized by changing the shape of a fluid in the cavity, which results in a change in the guiding properties of the fluid waveguide. The switching is realized by utilizing a change in the shape of the meniscus between a first and a second, non-miscible fluid. The shape of the meniscus determines the guiding (modal) properties of an optical waveguide system consisting of the two fluids and a transparent substrate. The meniscus can be changed by electrowetting forces. By changing the shape of the waveguide (i.e. by changing the shape of the meniscus) the guiding properties of the waveguide are changed, hence the transfer of an optical signal between the input and output ends of the waveguide can be controlled.

The invention can be applied in the fields of, for example, lighting (manipulation of the light distribution), sensing applications (addressable sensor, building block for biosensor), optical telecommunication (optical switching), and as a building block of a laser cavity to create a continuously variable waveguide. In all of these cases a switchable fluid waveguide greatly enhances the versatility of the device/application.

Advantageously, the waveguide further comprises means for adjusting the meniscus. The means for adjusting the meniscus preferably comprise a voltage source and at least two electrodes. By providing an arrangement of electrodes and voltage source across the body of the waveguide, the meniscus between the two fluids can be easily adjusted. Selection of the number and position of the electrodes results in asymmetric and symmetric menisci, as desired.

In simple embodiments of the waveguide, the body includes side walls defining a rectangular cavity, or the body includes a side wall defining a circular cylindrical cavity. These simple physical arrangements are straightforward to manufacture and easy to integrate into larger systems.

Preferably, at least a portion of a side wall is comprised of or coated with an hysteresis reducing substance. The reduction of hysteresis within the cavity is important in ensuring that the meniscus will move under the influence of the means that is adjusting it, and will return to its rest position without sticking to the side walls of the cavity.

In the basic embodiment of the waveguide, the meniscus is uniform along the optical path through the cavity. However, advantageously, the means for adjusting the meniscus is arranged to produce a meniscus that is non-uniform along the optical path through the cavity. If the meniscus is non-uniform along the cavity, thereby with non-constant angle of the meniscus along the cavity, then the optical propagation properties of the waveguide will vary along the length of the cavity. This allows a waveguide to be created that can be used in more complicated optical systems, such as lasers, with the added benefit that the configuration of the meniscus can be changed to vary the optical properties.

Preferably, the first fluid is an electrically insulating liquid and the second fluid is an electrically conducting liquid, or the first fluid is an electrically conducting liquid and the second fluid is an electrically insulating liquid. Ideally, the electrically insulating liquid has a refractive index of between 1.25 and 1.50 and the electrically conducting liquid has a refractive index of between 1.33 and 1.50. The two fluids in the cavity are immiscible and their differing electrical and optical characteristics combine to support the function of the variable propagation modes of the waveguide. The electrical conducting liquid in the cavity will alter its position, and hence alter the meniscus between the fluids, under the influence of the means for adjusting the meniscus.

Embodiments of the present invention will now be described, by way of example only, with reference to the accompanying drawings, in which:—

Figure 1:
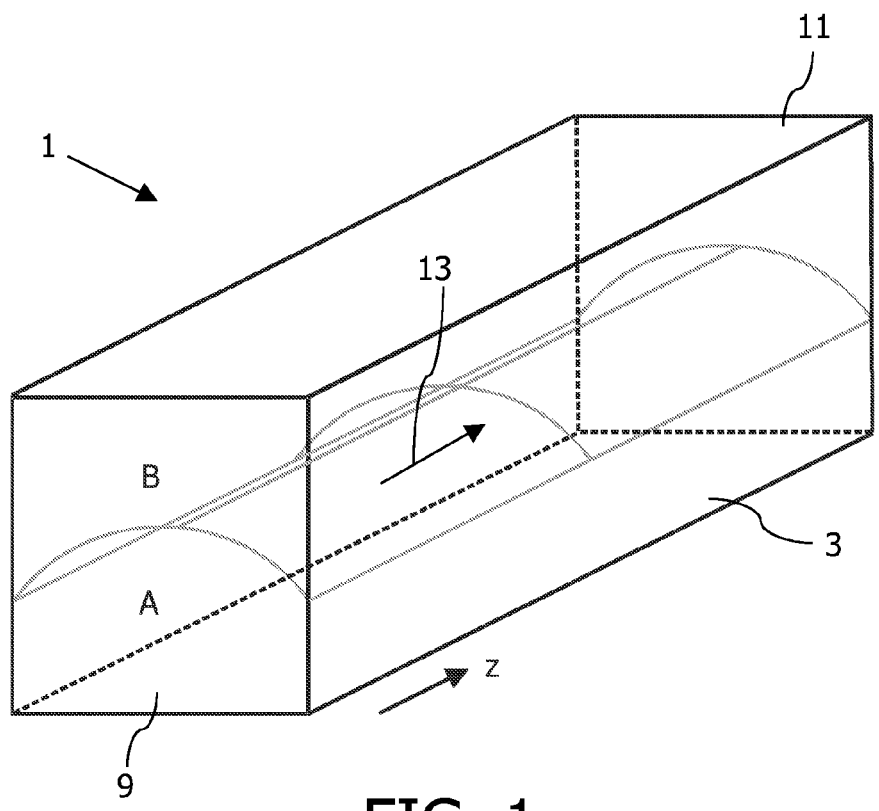
FIG. 1 is a schematic perspective view of an optical waveguide.
Figure 2:
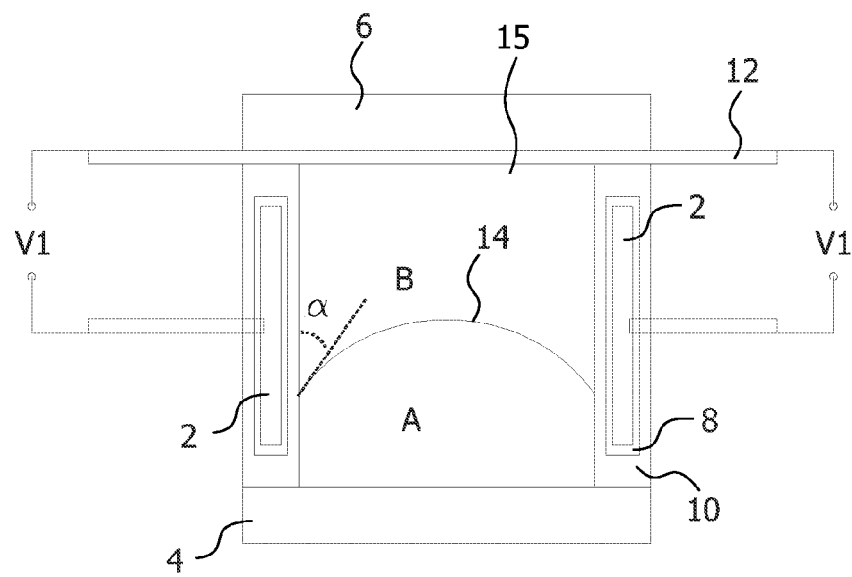
FIG. 2 is a cross-section of the waveguide of FIG. 1 showing further detail.
Figures 3A, 3B:
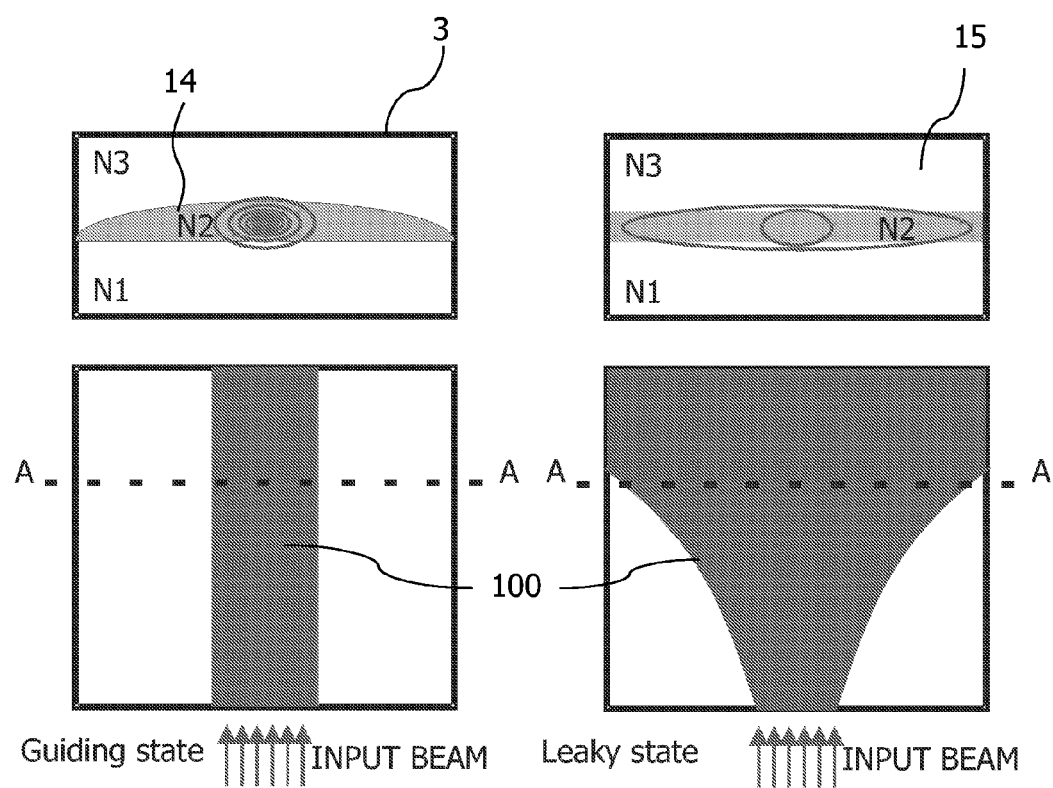
Figure 4:
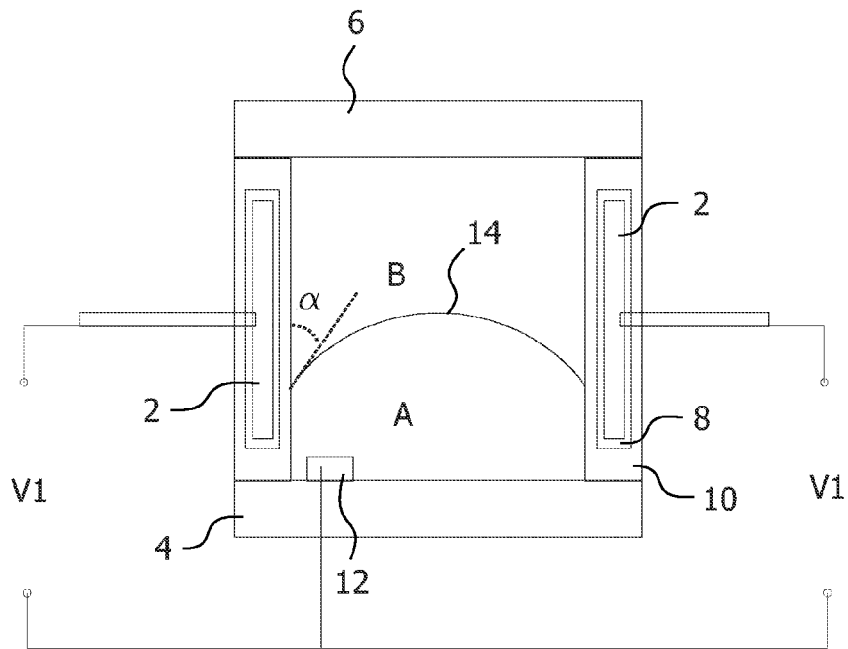
Figure 5:
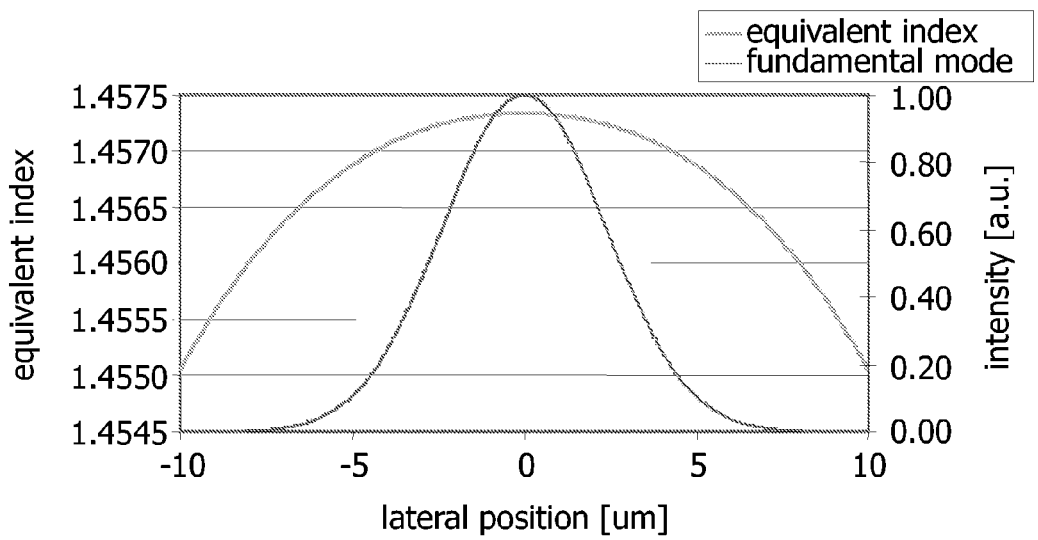
Figures 6A, 6B:
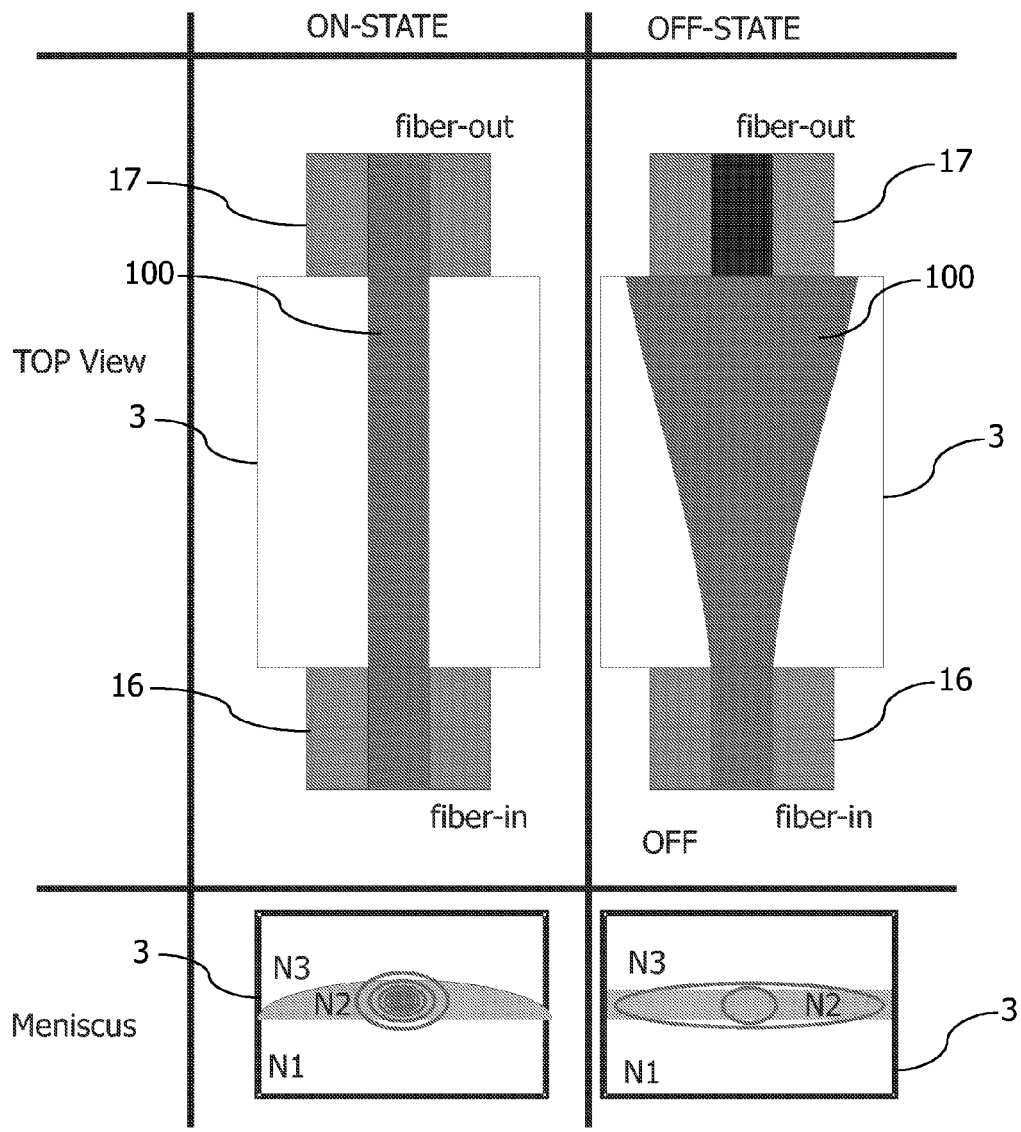
Figures 7A, 7B:
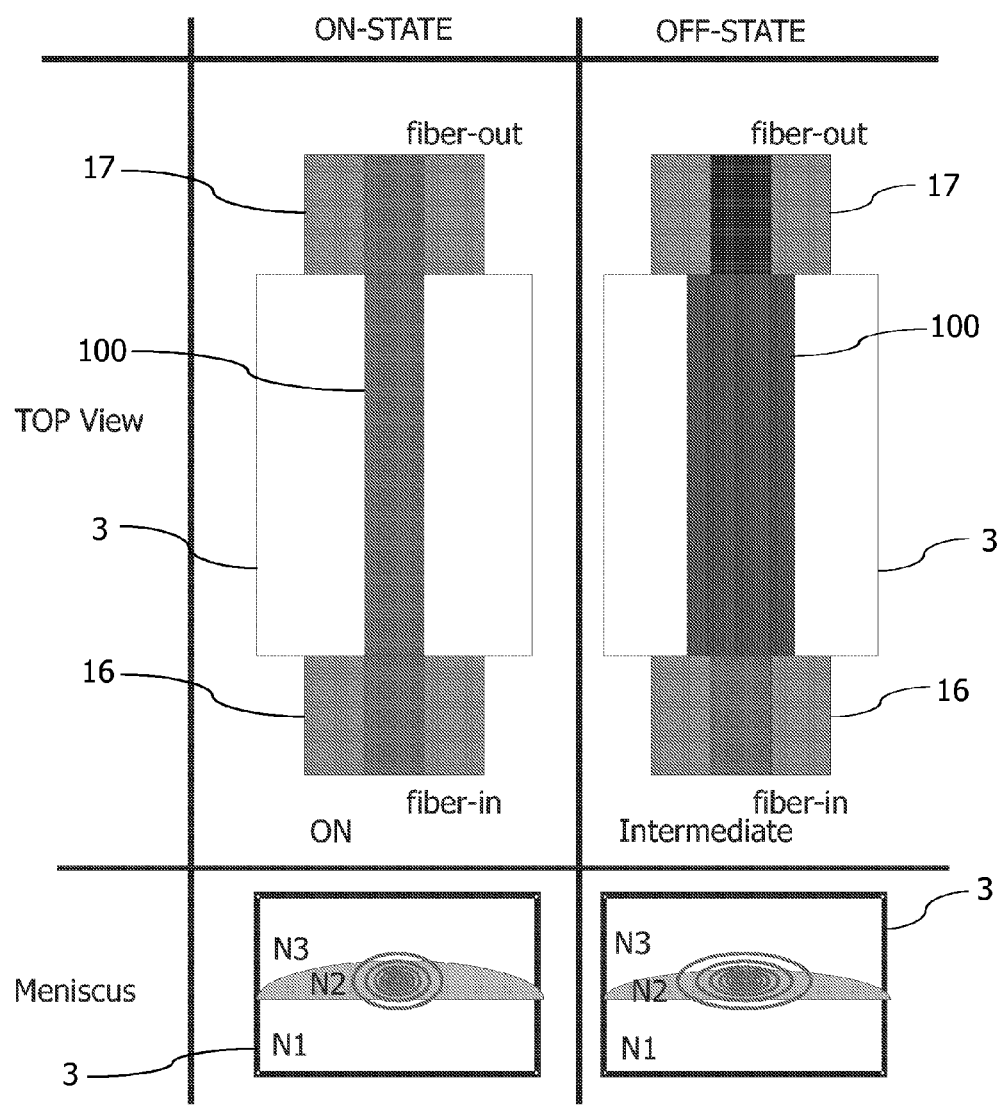
Figure 8:
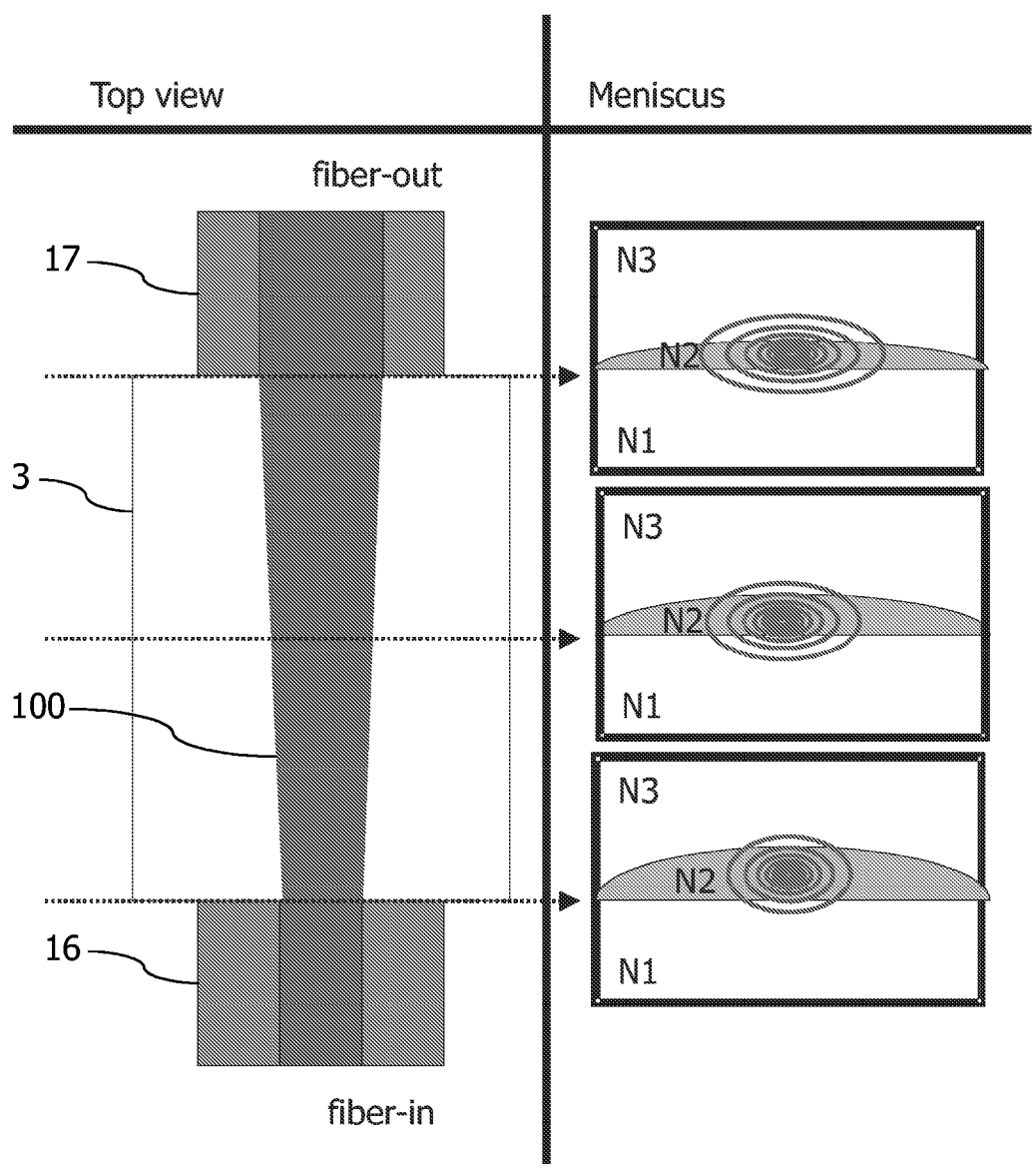
Figure 9:
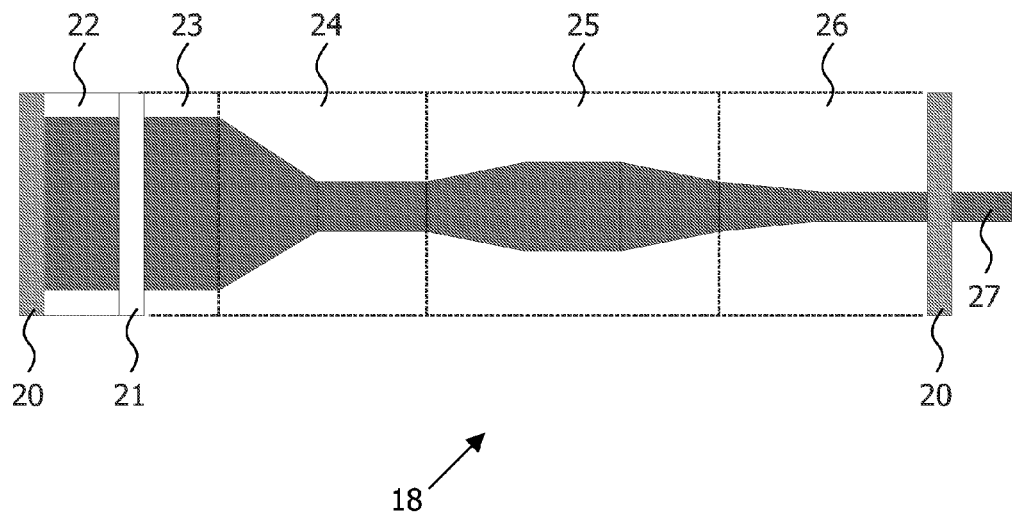
Figure 10:
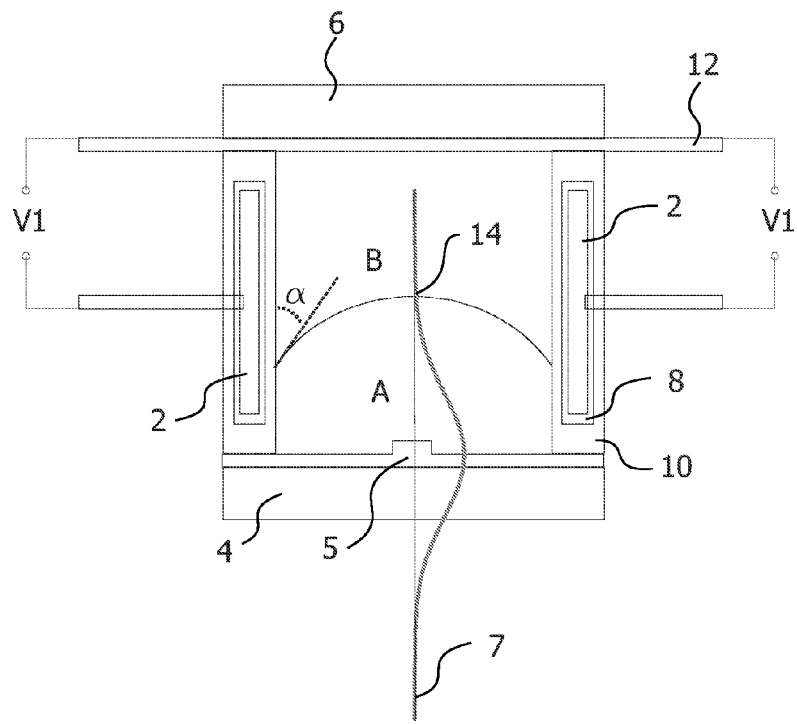
Figure 11:
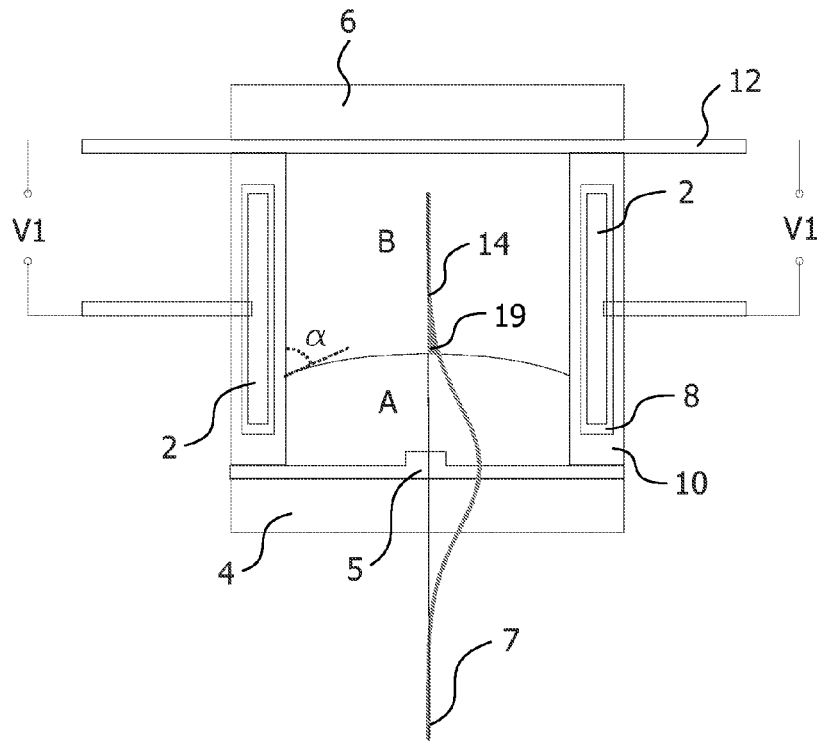
Figure 12:
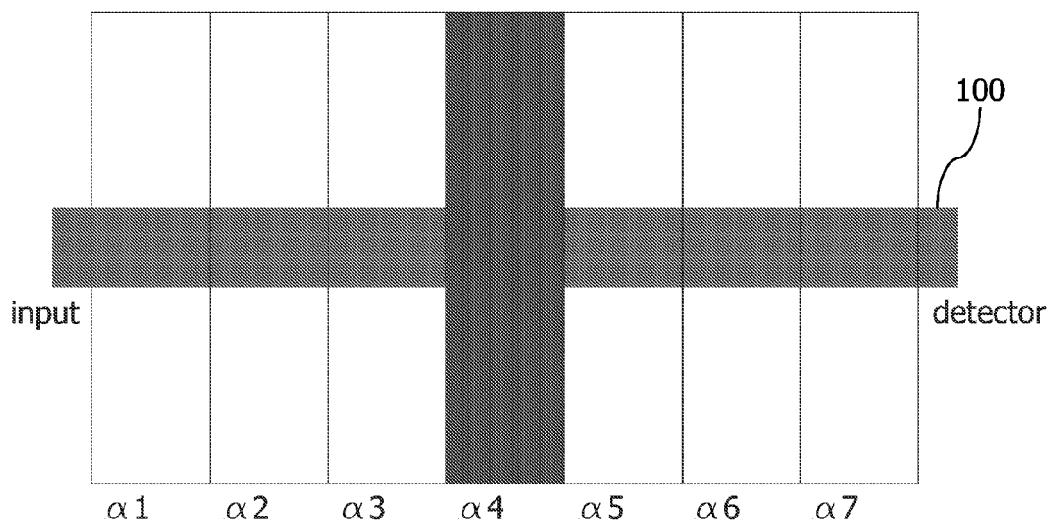

FIG. 3a is top plan view and cross-sectional view of the waveguide of FIGS. 1 and 2 in a first operational state, FIG. 3b is top plan view and cross-sectional view, similar to FIG. 3a, of the waveguide of FIGS. 1 and 2 in a second operational state, FIG. 4 is a cross-sectional view, similar to FIG. 2, of a second embodiment of the waveguide, FIG. 5, is a graph showing the equivalent index and fundamental mode of the embodiments of the waveguide, FIGS. 6a and 6b are views similar to FIGS. 3a and 3b, showing top plan views and cross-sectional views of the waveguide in first and second operational states, in a fibre optic system, FIGS. 7a and 7b are views similar to FIGS. 3a and 3b, showing top plan views and cross-sectional views of the waveguide in first and third operational states, in a fibre optic system, FIG. 8 is a top plan view and three cross-sectional views of a third embodiment of the waveguide, in a fibre optic system, FIG. 9 is a side plan view of a laser incorporating multiple waveguides, FIG. 10 is a cross-sectional view, similar to FIG. 2, of a fourth embodiment of the waveguide, FIG. 11 is a cross-sectional view, similar to FIG. 10, of the fourth embodiment of the waveguide, with the meniscus in a second position, and FIG. 12 is a top plan view of a sensor device incorporating multiple waveguides of the fourth embodiment.

FIG. 1 illustrates the optical waveguide 1 in a general form. The optical waveguide 1 comprises a body 3. The body 3 includes an entrance window 9 and an exit window 11 defining an optical path 13 through a cavity 15 (see FIG. 2), the cavity 15 containing a first fluid A and a second fluid B. The interface between the first fluid A and the second fluid B is defined by a meniscus 14 (see FIG. 2), the meniscus 14 lying longitudinally along the optical path 13. The arrow z in Figure illustrates the direction of the optical signal through the waveguide 1.

A more detailed view of the waveguide 1 is shown in FIG. 2, which is a cross-section through the waveguide 1 shown in FIG. 1. The two fluids A and B form the interface at the meniscus 14, with the meniscus 14 forming an angle α relative to the side wall 10. In this Figure, in the side walls 10, rectangular electrodes 2 extend in the direction normal to the plane of the Figure. Each electrode 2 is covered by an insulating layer 8, for example parylene. The fluid contact layer 10, in order to reduce hysteresis in the shape of the meniscus, is constructed from a hysteresis reducing substance such as Teflon® AF1600 produced by DuPont™.

The bottom wall of the body 3 of the waveguide 1 is formed by a transparent substrate 4, which can be a glass substrate such as LiF. The top wall is formed by a cover layer 6 (which does not need to be transparent) that protects an upper electrode 12. In the cavity 15, the first fluid A is an electrically insulating first liquid, like silicone oil; with a typical refractive index between 1.25 and 1.60 and the second fluid B is an electrically conducting second liquid, like water containing a salt solution; with a typical refractive index between 1.33 and 1.50.

In this embodiment, it is assumed that the index of liquid A is higher than of liquid B. Moreover, it is desirable that the liquids have equal density in order to avoid influence of gravity on the shape of the meniscus 14.

The principle of a switchable fluid waveguide by means of shape deformation is shown in FIGS. 3a and 3b, for a three-layer system with the refractive index of the fluid layer (N2) larger than its environment (N1, N3). In the FIG. 3a, the cross-sectional view through the waveguide 1, N1 is the substrate 4 of FIG. 2, N2 is the first fluid A and N3 is the second fluid B. In conventional fibre optic construction, fluid A is the core of the waveguide and substrate 4 and fluid B form the lower and upper cladding of the waveguide.

In the structure of the waveguide 1 in FIGS. 3a and 3b typical parameters are: the substrate 4 is made of LiF, and has an index of refraction of 1.3938 for a wavelength of 500 nm. Liquid A has an index of refraction of 1.46, and liquid B has an index of refraction of 1.455. The contact angle α between the meniscus 14 and the fluid contact layer 10 is of 78.7 degrees. Fluid A has a centre-edge height difference of 1 micron, and fluid A has a height of 2 microns in the centre.

The principle of the switchable fluid waveguide 1 is illustrated in FIGS. 3a and 3b. The shape of the light beam 100 in these Figures is shown by the grey beam. In FIG. 3a, the switchable fluid waveguide 1 is in the guiding (on) state, where the optical signal 100 is not only confined in the vertical direction but also in horizontal direction due to the shape of the meniscus 14. In FIG. 3b, the switchable fluid waveguide 1 is in the leaky (off) state where the optical signal 100 is confined in the vertical direction only.

In the guiding state, the light 100 is confined in the vertical direction as N2>(N1, N3) and assuming that the fluid film is sufficiently thick. The light 100 is also confined in the horizontal direction due to the shape of the fluid film. Here it is assumed that the shape of the meniscus is such that the light experiences a sufficiently large index contrast in the horizontal direction. In the cross-sectional view of FIG. 3a, the beam of light 100 is shown as confined to roughly the centre of the waveguide 1, with no substantial dispersion.

In the leaky state, the light 100 is confined in the vertical direction as N2>(N1, N3), assuming that the fluid film is sufficiently thick; however, the light 100 is not confined in the horizontal direction, as the index is uniform in the horizontal direction. As a consequence, the light 100 of the focused input beam is not confined in the lateral direction and diverges in the horizontal direction (in a similar fashion to a beam in a uniform medium).

As can be seen in the cross-sectional view in FIG. 3b, the meniscus 14 separating the two fluids A and B has changed shape, and the optical properties of the waveguide 1 have likewise been changed. The beam of light 100 entering the waveguide 1 will now be dispersed rather than being propagated. The embodiment of the waveguide 1 shown in FIGS. 3a and 3b effectively operates as a switch, with FIG. 3a showing an on state and FIG. 3b showing an off state.

The change in the position of the meniscus 14 is achieved by altering the voltage supplied by the voltage V1 (as can be seen in FIG. 2). This will change the electrical field over the body 3 of the waveguide 1, and will affect the electrically conducting fluid B (shown as N3 in FIGS. 3a and 3b). The meniscus 14 in FIG. 3b is virtually horizontal having been standard concave in FIG. 3a. It is possible to change the field over the waveguide 1 to such an extent that the meniscus 14 becomes convex, however it is sufficient to adjust the meniscus 14 to the position shown in FIG. 3b to achieve the desired effect of substantially reducing the propagation of light by the waveguide 1.

The shape of the meniscus is invariant in the direction of propagation (z in FIG. 1) and controlled by changing the z-invariant voltage V1 between the electrode on the left/right side of the waveguide 1 and the upper/lower electrodes.

FIG. 4 shows a second embodiment of the waveguide 1. It is substantially the same as that shown in FIG. 2, with the difference that the position of the electrode 12 has been moved from its position at the top of the waveguide in FIG. 2 to a position just above the substrate 4 in FIG. 4. In practical terms, the selection of the positions of the electrodes in the waveguide 1 is a matter of design choice.

In FIG. 4 the liquid A is the electrically conducting first liquid, such as a water containing salt solution; with a typical index between 1.33 and 1.50, and liquid B is the electrically insulating second liquid, such as silicone oil; with a typical index between 1.25 and 1.60. The lower electrode 12 is preferably in the shape of a wire in the direction of propagation in order to minimize losses of the light due to the absorption by the electrode.

FIG. 5 shows the equivalent index in the lateral direction due to the shape of the meniscus and the lateral intensity distribution of the fundamental mode as a function of the lateral position, for the waveguide of FIGS. 1 and 2. The distance between the electrodes is 20 microns. Using the effective index method, it is possible to approximate the 3D waveguide to a 2D waveguide system with an equivalent index in the lateral (between the electrodes) direction. FIG. 5 shows the equivalent index in the lateral direction for TE polarized light as a function of the height of fluid A.

The modes of the waveguide have been calculated by dividing the waveguide into 9 slices of constant index of refraction. From these calculations, it has been concluded that the 2D waveguide supports 4 modes; FIG. 5 shows the lateral intensity distribution of the fundamental mode. By excitation of the fluid waveguide with a Gaussian beam with a waist of 4 microns, it is possible to couple 98% of the optical power into the fundamental lateral waveguide mode.

FIGS. 6a and 6b show an on-off switch that consists of the z-invariant waveguide 1 as described above. The input and output waveguides are covered/closed by an optically transparent material (which can be, for example, the same material as the substrate 4) in order to avoid leakage of the fluids. The waveguide 1 is coupled to input fibres 16 and output fibres 17 in order to excite the waveguide and to collect the power guided by the waveguide. Other means for excitation, such as a focussed spot (for example, by using a lens and collection by a pinhole in front of a detector) are possible.

In FIG. 6a, in the on-state, the meniscus 14 between the fluids A and B has a contact angle α smaller than 90 degrees and α is sufficiently small in order to support at least one guided mode. All the light 100 of the input fibre 16 is guided and transferred to the output fibre 17.

In the off-state, shown in FIG. 6b, the meniscus 14 between the fluids A and B has a contact angle α that is now larger than 90 degrees, resulting in a waveguide 1 that does not support a guided mode. The light 100 from the input fibre 16 is not guided horizontally and diverges in the direction of the output fibre 17. In this case only a small fraction of light 100 (which depends on the width of the beam in front of the output fibre) is collected by the output fibre 17.

FIGS. 7a and 7b show a variable optical attenuator that consists of the z-invariant waveguide 1 as described above. The input and output waveguides are covered/closed by an optically transparent material (for example, the same material as the substrate 4) in order to avoid leakage of the fluids A and B. The waveguide is coupled to input fibres 16 and output fibres 17 in order to excite the waveguide and to collect the power guided by the waveguide 1.

As in the embodiment of FIGS. 6a and 6b, the meniscus 14 between the fluids A and B has a contact angle α smaller than 90 degrees and α is sufficiently small in order to support at least one guided mode. For proper operation (for example, monotonic dependence of attenuation on the shape of the meniscus) of the variable optical attenuator, it is important that the optical power is essentially guided by a single mode.

The variable optical attenuator functions by a mismatch between the mode of the fluid waveguide 1 and the modes of the input/output fibres 16 and 17. An increased mismatch results in a reduced power collected by the output fibre 17. The transfer from the input fibre 16 to the output fibre 17 can be controlled by varying the shape of the meniscus between fluids A and B. Any change in the electrical field over the body 3 of the waveguide 1 will result in a change in the shape of the meniscus 14, with a gradient change in the shape of the meniscus resulting in a proportionally gradient change in the propagation properties of the waveguide 1. This allows the waveguide 1 to be used in this embodiment as a variable propagator of the light 100 received from the input fibre 16.

All of the embodiments discussed above relate to z-invariant waveguides where the shape of the meniscus 14 between fluids A and B is constant in the direction of propagation z. By varying the shape of the meniscus 14 in the direction of propagation it is possible to change continuously the layout and functionality of the waveguides over the chip.

FIG. 8 gives an example of a continuously variable waveguide 1 where the shape of the meniscus 14 is varied continuously from the input interface with the input fibre 16 towards the output fibre 17. As a result, the light 100 from the input fibre 16 is matched with the output fibre 17 even though the fibres are different. The waveguide 1 is operated in such a manner that the shape of the meniscus 14 varies continuously from the interface with input fibre 16 towards the output fibre 17. The shape of the meniscus 14 can be varied by varying the voltage between the left/right electrodes 2 and the upper electrode 12 along the direction of propagation (z).

A 100% transmission of the light 100 will be achieved by the waveguide 1 in FIG. 8 if there is perfect matching between waveguide mode at the input facet and mode of input fibre, perfect matching between waveguide mode at the output facet and mode of output fibre, and a change of the shape of the meniscus from the input to the output facet that is sufficiently smooth/adiabatic resulting in no transition losses between the input and the output facets. This is obtained by changing the voltage gradually, for instance by using a resistive material between electrodes on the start and end of the waveguide 1. All of the light from the input fibre 16 is transferred to the output fibre 17, even though the fibres do not themselves match.

The continuously variable waveguide 1 of FIG. 8 can be used in a number of different optical devices. One example of such a device is a laser cavity, shown in FIG. 9. This Figure shows an example of laser cavity 18 that is made of continuously variable waveguides. When a laser cavity 18 is made of a continuously variable waveguide it is possible to tune the laser properties such as the output beam shape and the wavelength of the laser.

The laser cavity 18 shown in FIG. 9 comprises a mirror 20, an anti-reflection coating 21 and an electrically pumped active medium 22. The laser cavity 18 also comprises four continuously variable waveguides 23 to 26, similar to those described with reference to FIG. 8. The waveguides 23 to 26 are shown as being four separate waveguides, but in practice, all four waveguides could be replaced by a single variable waveguide.

The functions of the waveguides in the laser cavity 18 are as follows: Waveguide 23 is for matching with the active medium. In this waveguide, the fundamental mode is matched with the profile generated by active medium. Waveguide 24 is the mode selector in which the modal profile of the light in the cavity is tapered down towards a single mode waveguide, with higher order modes being suppressed as they are converted into radiation by the single mode waveguide.

The next waveguide is the chamber 25, which is for wavelength tuning. This section of the cavity 18 consists of three subsections. The modal profile at input and output sides of this section is the same as the single mode waveguide of section 24. The optical path length, as experienced by the fundamental mode, can be changed by changing the width of the centre waveguide which results in a change of the effective index (phase change per unit length is proportional to the effective index of a waveguide mode) along the direction of propagation. The roundtrip phase shift is proportional with the optical path length, and as a consequence the resonance wavelength of the laser cavity can be tuned by changing the width of the centre waveguide in this section.

Finally waveguide 26 is a beam shaper. This section shapes the output beam to a desired width by varying the width of the output waveguide. The connection with section 25 is realized by means of tapering section, down towards the width of the output waveguide.

This embodiment of a laser cavity demonstrates the strength of a continuously variable waveguide. By using a single continuously variable waveguide it is possible to enable independent control of the resonance wavelength, single (lateral) mode behavior of the laser, and control of the output beam without compromising the coupling with the active medium. Examples of other applications can be found in the field of lighting. Application of a continuously variable waveguide enables an optical device to manipulate light distribution.

A further embodiment of the waveguide is shown in FIG. 10. The waveguide in this Figure is a similar system to that shown in, for example, FIG. 2, but with the addition of a patterned core region 5 on top of the substrate 4. The meniscus 14 is positioned so that the contact angle α is small enough in order to isolate the waveguide from layer B. The patterned (ridge) core layer 5 has a refractive index higher than the refractive indexes of the substrate 4 and the fluids A and B. This layer is the core region for a waveguide system with its modes centered in the core layer 5. The intensity pattern in the vertical direction of a mode supported by the waveguide system is shown by the line 7, with the intensity highest at the core 5 and reducing towards the meniscus 14. The intensity decreases exponentially away from the core 5.

The guiding properties of the waveguide can be controlled, as before, by changing the shape of the meniscus 14 between fluids A and B. By changing the meniscus between fluids A and B, fluid B can be moved away or brought closer to the core region 5 of the waveguide 1. In the example shown in FIG. 10, the vertical intensity pattern of the waveguide modes is almost zero in layer B. As a consequence the modes are hardly influenced by the properties of layer B.

FIG. 11 shows the waveguide of FIG. 10, but with the meniscus 14 adjusted so that the contact angle α of the meniscus 14 with the side wall 10 is significantly larger. As a consequence the modes of the waveguide are no longer isolated from layer B; as indicated by the filled region 19 on the vertical intensity pattern.

The real part of the index of layer B results in a change of the mode pattern and can be utilized for realizing a variable optical attenuator. Besides a change in the mode pattern, the presence of layer B also results in a change of the phase experienced by a mode propagating in the optical waveguide. This effect can be utilized for, for example, tuning of the phase difference between the branches of a Mach-Zehnder interferometer.

The imaginary part of the index of layer B results in an increase of the losses experienced by the waveguide mode. Because the shape of the meniscus controls the amount of losses, one can use this principle as basis for a variable optical attenuator. The principles of this embodiment are also applicable to z-variant meniscus shapes, as described above.

Instead of using the variation of the meniscus shape for switching applications, it is also possible to apply the principle of the embodiment of FIGS. 10 and 11 to sensing applications. Referring to these Figures, it can be seen that only for cases where the contact angle α is sufficiently large will the properties of layer B have an impact on the properties of the waveguide mode. This opens the way for an addressable sensor that only measures the properties of layer B at the desired locations (which can be chosen by a proper choice of the voltage between the left/right and upper electrodes).

As an example, a top view of an addressable sensor consisting of a straight waveguide with a cross-section similar to the embodiment of FIGS. 10 and 11 is shown in FIG. 12. This Figure shows a top view of an addressable sensor consisting of a series of waveguides. The detector is divided into seven sections; in FIG. 12 section four is addressed.

The fluid stack on top of the straight waveguide is subdivided into different (in the example 7) sections. The horizontal line from input to detector shows the passage of an optical signal 100 through the sensor. The modes of the waveguide are isolated from layer B for a certain minimum contact angle α=<α min and as a result the modes of the straight waveguide are only influenced by the properties of layer B in section 4 where α4>α min (α min being the minimum angle required at the meniscus 14 to have some intensity of the light pass through the fluid B).

For many sensing applications, one needs to perform measurements for different concentrations of the measured and (in this case fluid B) in order to determine the desired parameters. As an alternative, one can also vary the contact angle α which is equivalent to varying the number of molecules that influence the straight waveguide mode.

Although electrowetting (influencing a fluid with an electrical field) has been used in the above embodiments, many other methods of influencing the fluids A and B within the cavity in the waveguide are possible. For example, inducing a local pressure difference between fluid A and B could be used for changing the shape of the meniscus.

The invention claimed is:

1. An optical waveguide comprising a body, the body including an entrance window and an exit window defining an optical path through a cavity, the cavity containing a first fluid and a second fluid, with an interface between the first fluid and the second fluid defined by a meniscus, the meniscus lying longitudinally along the optical path, wherein the meniscus contacts two substantially opposed side walls of an interior surface of the cavity substantially parallel to the optical path, and wherein the first fluid is an electrically insulating liquid and the second fluid is an electrically conducting liquid.

2. The waveguide according to claim 1, and further comprising means for adjusting a shape of the meniscus.

3. The waveguide according to claim 2, wherein the means for adjusting the shape of the meniscus comprises a voltage source, and at least two electrodes.

4. The waveguide according to claim 1, wherein the body includes side walls defining a rectangular cavity.

5. The waveguide according to claim 1, wherein the body includes a side wall defining a circular cylindrical cavity.

6. The waveguide according to claim 4, wherein at least a portion of a side wall is comprised of or coated with an hysteresis reducing substance.

7. The waveguide according to claim 1, wherein the meniscus is uniform along the optical path through the cavity.

8. The waveguide according to claim 1, wherein the means for adjusting the meniscus is arranged to produce a meniscus that is non-uniform along the optical path through the cavity.

9. The waveguide according to claim 1, wherein the electrically insulating liquid has a refractive index of between 1.25 and 1.50 and the electrically conducting liquid has a refractive index of between 1.33 and 1.50.

10. A method of guiding an optical signal comprising receiving an optical signal at an entrance window of a body of a waveguide and guiding the optical signal along an optical path through a cavity of the body and to an exit window of the body, wherein the cavity contains a first fluid and a second fluid, with an interface between the first fluid and the second fluid defined by a meniscus, the meniscus lying longitudinally along the optical path, wherein the meniscus contacts two substantially opposed sides of an interior surface of the cavity substantially parallel to the optical path, and wherein the first fluid is an electrically insulating liquid and the second fluid is an electrically conducting liquid.

11. The method according to claim 10, and further comprising adjusting a shape of the meniscus.

12. The method according to claim 11, wherein the adjusting of the shape of the meniscus is executed by a voltage source and at least two electrodes.

13. The method according to claim 10, wherein the meniscus is uniform along the optical path through the cavity.

14. The method according to claim 11, wherein the adjusting of the meniscus is arranged to produce a meniscus that is non-uniform along the optical path through the cavity.

15. The method according to claim 10, wherein the electrically insulating liquid has a refractive index of between 1.25 and 1.50 and the electrically conducting liquid has a refractive index of between 1.33 and 1.50.

\* \* \* \* \*